T. B. JEFFERY.
VEHICLE WHEEL.
APPLICATION FILED APR. 1, 1907.
931,615.
Patented Aug. 17, 1909.
2 SHEETS—SHEET 1.
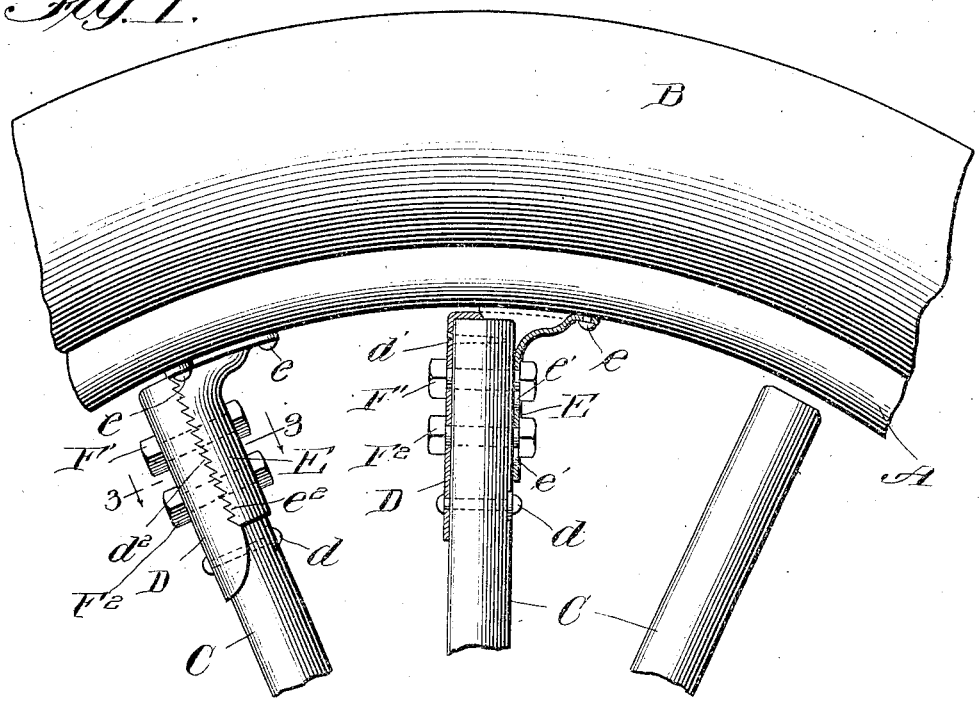
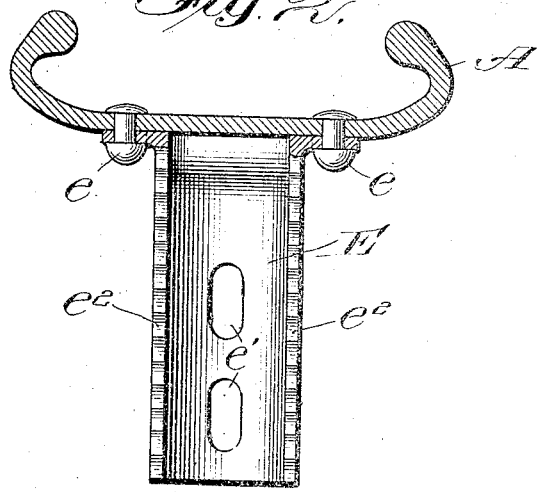
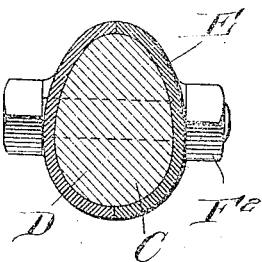
Witnesses:
Harry S. Gaither
Ruby V. Nash
Inventor:
Thomas B. Jeffery
by Hamlin Wilkinson
Attys T. B. JEFFERY.
VEHICLE WHEEL.
APPLICATION FILED APR. 1, 1907.
931,615.
Patented Aug. 17, 1909.
2 SHEETS—SHEET 2.
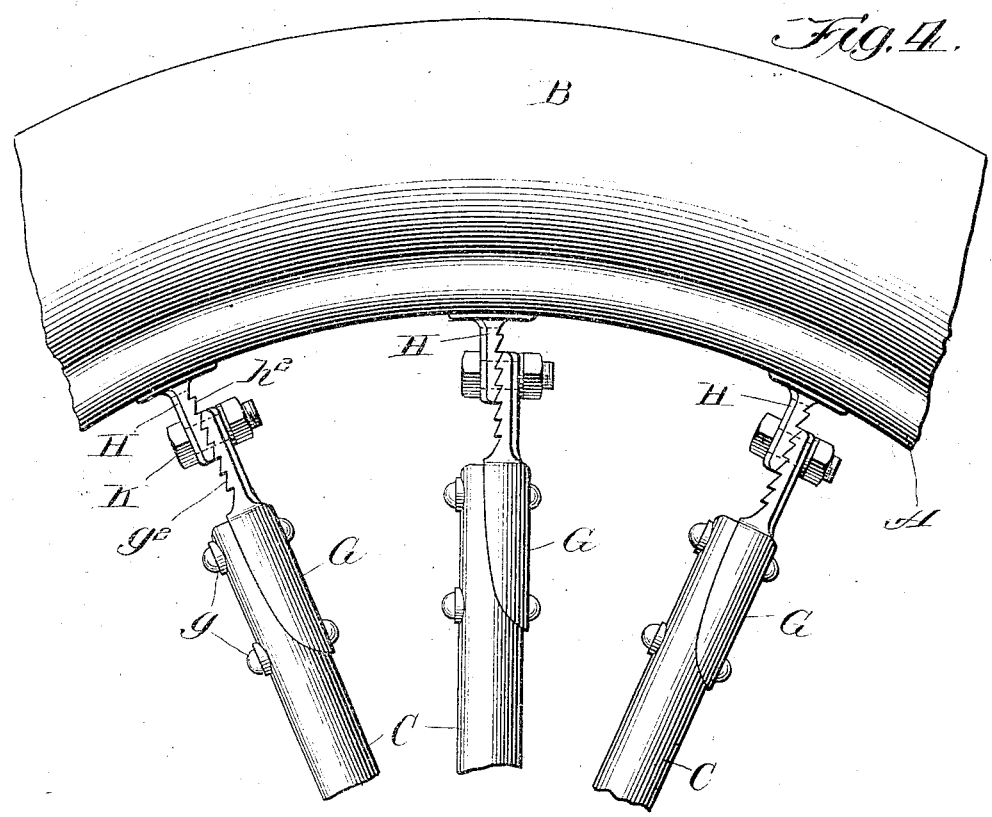
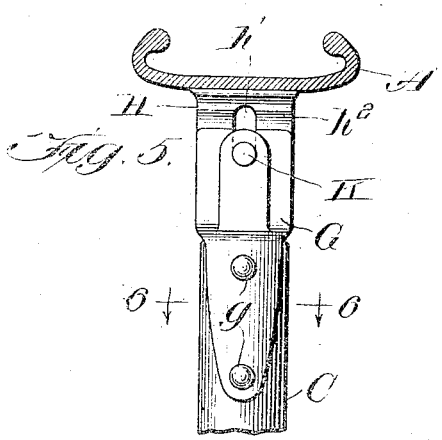
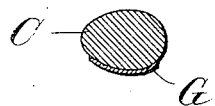
Witnesses.
Harry S. Gaither.
Ruby V. Nash.
Inventor:
Thomas B. Jeffery.
by Chamberlin Wilkinson
attys

UNITED STATES PATENT OFFICE.

THOMAS B. JEFFERY, OF KENOSHA, WISCONSIN.

VEHICLE-WHEEL.

No. 931,615.

Specification of Letters Patent.   Patented Aug. 17, 1909.

Application filed April 1, 1907.   Serial No. 365,869.

*To all whom it may concern:*

Be it known that I, THOMAS B. JEFFERY, a citizen of the United States, residing at Kenosha, county of Kenosha, State of Wisconsin, have invented a certain new and useful Improvement in Vehicle-Wheels, and declare the following to be a full, clear, and exact description of the same, such as will enable others skilled in the art to which it pertains to make and use the same, reference being had to the accompanying drawings, which form a part of this specification.

My invention relates in general to vehicle wheels, and more particularly to wheels having removable tire-supporting rims.

In the use of pneumatic tires inconvenience and labor are occasioned by punctures, as it is then necessary to remove the tire from the rim and secure thereon a new tire, or when a double tube tire is used it is necessary to detach the outer casing from the rim and to remove and repair the punctured one, after which the tire must be inflated. Considerable loss of time and trouble are consequently occasioned by the puncture of any form of pneumatic tire owing to the necessity of removing the tire from the rim.

The primary object of my invention is to provide a vehicle wheel around the ends of the spokes of which a fully inflated pneumatic tire may be quickly and easily secured, thereby avoiding the necessity of repairing a punctured tire on the road and of inflating the repaired tire, or a new one substituted for the punctured tire.

A further object of my invention is to provide a vehicle wheel, the spokes of which are adjustable in length so that tire supporting rims of different sizes may be detachably secured around the wheel.

A still further object of my invention is to provide a detachable tire-supporting rim for vehicle wheels which will be simple in construction, inexpensive in manufacture, and efficient in use.

The embodiment of my invention herein disclosed may be generally described as consisting of a vehicle wheel having lugs secured upon the ends of the main spoke members, lugs projecting inwardly from the rim adapted to over-lap the lugs on the ends of the main spoke members, the engaging surfaces of the over-lapping lugs on the rim and spokes having transverse oppositely directed teeth, and bolts extending through the over-lapping lugs for securing the whole together.

My invention will be more fully described hereinafter with reference to the accompanying drawing in which the same is illustrated as embodied in two convenient and practical forms, and in which—

Figure 1 is a side elevational view of a portion of a vehicle wheel embodying my invention; Fig. 2 an elevational view of one of the rim lugs, the rim being shown in section; Fig. 3 a sectional view on line 3—3 Fig. 1; Fig. 4 a view similar to Fig. 1 showing a modified form of my invention; Fig. 5 a sectional view; and Fig. 6 a sectional view.

Similar reference characters are used to designate similar parts in the several figures of the drawings.

Reference letter A designates a rim about which a pneumatic tire is adapted to be detachably secured. For convenience I have shown a clencher type of rim.

B indicates a pneumatic tire supported upon the rim A.

C, C, designate the main spoke members of a vehicle wheel.

D, D, indicate semi-cylindrical lugs or caps secured to the ends of the members C, C by any suitable fastening devices, such for instance as a rivet $d$ extending through the lower portion of the lug and the adjacent portion of the main spoke member. A screw $d'$ may also be provided extending through the upper end of each lug D and into the underlying portion of the adjacent main spoke member. The radial edges of each lug D is provided with teeth $d^2$ inwardly directed.

E, E designate semi-cylindrical lugs or sleeves secured to the inner surface of the rim A at distances apart corresponding to the spaces between the ends of the spokes. The lugs E may be secured to the inner surface of the rim in any suitable manner, as by brazing or by means of rivets $e$. The radial edges of the lugs E are provided with outwardly directed teeth $e^2$. The cross-section of each lug E is such as to extend approximately half way around the main spoke member so that the teeth on the edges thereof will engage with the teeth on the corresponding lug D.

Any suitable clamping devices may be provided for detachably securing the lugs E around the ends of the main spoke members, such for instance as bolts F' and F² extending through holes in the lug D and through elongated slots e' in the diametrically opposite portion of the lug E.

In Figs. 4, 5, and 6 I have illustrated a modified form of my invention in which the lugs project beyond the ends of the main spoke members and over-lap the corresponding lugs on the rim. Reference letters G, G designate the lugs which are secured to the main spoke members by any suitable fastening devices, such for instance as rivets $g$. The portions of the lugs which project beyond the ends of the main spoke members are provided with transverse inwardly directed teeth $g^2$. H, H designates the lugs which are secured to the inner surface of the rim A, and which are provided with transverse outwardly directed teeth $h^2$. Any suitable clamping devices may be used for detachably retaining the over-lapping lugs on the spokes and rim in engagement such for instance as bolts K which extend through holes in the lugs G and through elongated slots $h'$ in the lugs H.

The rim and tire thereon may be readily detached from the wheel by removing the clamping bolts so that the over-lapped lugs may be separated. A new rim with a fully inflated tire may then be secured around the main spoke members by bringing the lugs thereon into contact with the lugs on the ends of the spokes. The bolts are then inserted through the registering holes and slots in the lugs so as to clamp the over-lapped lugs tightly together. It is obvious that the tightening of the clamping bolts throws the engaged teeth into close engagement so that when the teeth do not come into exact register the inclined surfaces of the teeth tend to force the rim outwardly, inasmuch as the teeth on the spoke-lugs are inwardly directed and the teeth on the rim-lugs outwardly directed. It is also evident that by the use of my invention it is possible that rims of slightly different diameters may be secured to the same wheels, inasmuch as the lugs overlap sufficiently to permit a secure engagement to be effected even though the rims may vary in size.

From the foregoing description it will be observed that I have invented an improved vehicle wheel comprising a detachable tire-supporting rim and spokes adjustable in length, the over-lapping lugs in effect constituting portions of the spokes. It is also obvious that by the employment of my invention the rims may be readily secured around the ends of the spokes and at the same time forced outwardly so as to obviate any play between the rim and the wheel which it surrounds.

While I have described more or less precisely the details of construction, I do not wish to be understood as limiting myself thereto, as I contemplate changes in form, the proportion of parts, and the substitution of equivalents, as circumstances may suggest or render expedient without departing from the spirit of my invention.

Having now fully described my invention, what I claim as new and desire to secure by Letters Patent is:

1. In a vehicle wheel, the combination with the main spoke members thereof, of lugs secured upon the ends of the said members, a detachable tire-supporting rim surrounding the said members, lugs projecting inwardly from said rim and over-lapping the aforesaid lugs, transverse teeth on the engaging surfaces of the over-lapped lugs, and means for securing the lugs together with the teeth thereon interlocked.

2. In a vehicle wheel, the combination with the main spoke members thereof, of lugs secured to the ends of the said members, a detachable tire-supporting rim surrounding the said members, lugs projecting inwardly from said rim over-lapping the lugs on the said members, and bolts clamping the over-lapped lugs together extending through a slot in one lug of each over-lapped pair and through a hole in the other lug of each pair.

3. In a vehicle wheel, the combination with the main spoke members thereof, of lugs secured upon the ends of the said members, a tire-supporting rim surrounding the said members, lugs projecting inwardly from said rim and over-lapping the aforesaid lugs, transverse teeth on the engaging surfaces of the over-lapping lugs, and bolts for clamping the over-lapped lugs together extending through a slot in one lug in each pair and through a hole in the other lug of each pair.

4. In a vehicle wheel, the combination with the main spoke members thereof, of lugs secured upon the ends of the said members, a tire-supporting rim surrounding the said members, lugs projecting inwardly from said rim over-lapping the aforesaid lugs, transverse teeth on the engaging surfaces of said lugs, the teeth on the spoke-lugs being inwardly directed and those on the rim-lugs being outwardly directed, and means for clamping the over-lapped lugs together with their teeth interlocked.

5. A detachable tire-supporting rim for vehicle wheels comprising lugs extending inwardly from the rim having transverse teeth adapted to engage similar teeth on lugs secured to the ends of the main spoke members of a vehicle wheel.

6. In a vehicle wheel, the combination with a rim, of a wheel body including spokes arranged within said rim, each of said spokes comprising two members having teeth with faces inclined to the axis of the spoke, and bolts passing through the two members of each spoke for securing them together.

7. In a vehicle wheel, the combination with a rim, of a wheel body including spokes arranged within said rim, each of said spokes comprising two over-lapping members having oppositely arranged ratchet teeth on their meeting faces, and means for forcing the over-lapping portions of each spoke together in the direction at right angles to the axis of the spoke.

8. In a vehicle wheel, the combination with a rim, of a wheel body including spokes arranged within said rim, each of said spokes comprising two over-lapping members the inner of which has inwardly directed ratchet teeth and the other outwardly directed ratchet teeth, together with means for forcing the over-lapping portions of each spoke together.

In testimony whereof, I sign this specification in the presence of two witnesses.

THOMAS B. JEFFERY.

Witnesses:
J. J. YOUNG,
G. H. EDDY.